(Model.)

N. E. SHAILER.
LOCK NUT.

No. 292,513. Patented Jan. 29, 1884.

Witnesses:
Geo Shepard Page
Chas E. Booth

Inventor:
Nathan Emory Shailer
per Frank J. _____
Attorney.

UNITED STATES PATENT OFFICE.

N. EMORY SHAILER, OF PULLMAN, ILLINOIS.

LOCK-NUT.

SPECIFICATION forming part of Letters Patent No. 292,512, dated January 29, 1884.

Application filed June 27, 1883. (Model.)

*To all whom it may concern:*

Be it known that I, NATHAN EMORY SHAILER, a citizen of the United States, residing in the town of Pullman, county of Cook, State of Illinois, have invented a new and useful Improvement in what are known as Lock-Nuts, in connection with base or ratchet washers; and I do hereby declare the following to be a true and correct description of the construction and operation of the same, reference being had to the drawings accompanying this my specification.

The nature of my invention consists, chiefly, in the peculiar construction of the follower and the nut, the follower having upon its under side one or more recesses or annular grooves, the same to be for the displacement of the rubber or other elastic substance while under compression. On the upper side of the follower I have formed ratchet serrations or depressions, so that the follower and nut work reciprocally together, and form, in connection with a cup, washer, and rubber spring, what is known as a "lock-nut."

By reference to the accompanying drawings, I describe the operation and construction of my invention.

Figure 3:
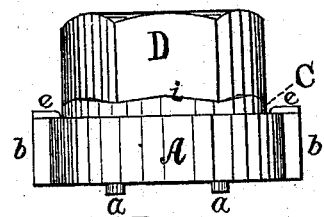
Figure 2:
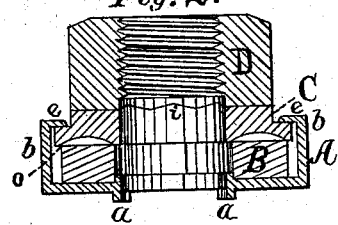
Figure 1:
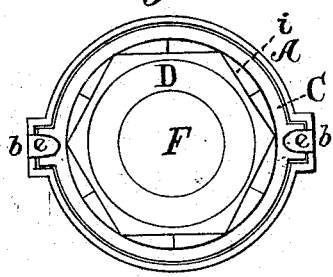

Figure 1 is a front view, showing the cup, follower, nut, and bolt. Fig. 2 is a cross-section through the center of Fig. 1; and Fig. 3 is a top view, showing the cup and the reciprocally-fitting ratchet serrations or depressions on faces of follower and nut.

In the drawings, A represents the cup, having within and resting upon its inner or bottom face the spring B, upon which spring, either of metal, rubber, or any other elastic substance, but preferably of rubber, I place my improved follower-washer, having on its under side one or more recesses or annular grooves, the same to be for the displacement of the rubber while under compression. Upon the upper side of the follower I have formed ratchet serrations or depressions $i$, as shown, and on the the under side of nut I have formed ratchet serrations or depressions $i$, so that the nut D and follower C work reciprocally and fit closely. I prefer that the serrations should be from four to eight in number, and from one thirty-second of an inch to four thirty-seconds of an inch in depth. The cup is held in position by having on the back side of same the projections or lugs $a$ $a$, fitting into the elliptical bolt-hole in the splice-bars or "fish-plates," so called. The cup is also held in position by several well-known devices now in general use.

On the outer side of cup A there are formed lug-pockets $b$ $b$, for the reception of reciprocally-fitting lugs on follower C. The clips or ears $e$ $e$ on the outer side of lug-pockets hold down upon the projecting lugs on follower, thus forming, substantially, a fixed washer. Now, with the use of an ordinary wrench, I advance the nut-bolt D upon the bolt F until it comes in contact with the follower C. By further advance of nut upon bolt, I compress the rubber B by the pushing down into the cup A the follower C, and the severe compression of the rubber B causes the follower C to rebound into the reciprocally-fitting ratchet serrations or depressions $i$, thus making a positive lock to the nut, and at same time the rebounding of the follower C releases the severe strain upon the bolt F, and will thus make an efficient and useful allowance for the expansion and contraction of metal in bolt under the various changes of temperature.

I secure through the above-described improvement in lock-nuts an efficient and positive result by the use of an ordinary wrench, and am not obliged to use other mechanical means outside of an ordinary wrench to disengage the ratchet bearing-surfaces.

While I prefer to manufacture my said invention according to the directions and specifications above given, I do not limit myself to the precise methods and details above employed.

The serrated follower may be used alone, without any elastic substance and without forming any part of the combined washer.

I may use any elastic substance in the place of rubber in the combined washer.

I am aware that ratchet and base washers have been heretofore used; but they have been so constructed as to require extra labor and tools to disengage the ratchet bearing-surfaces, aside from an ordinary wrench, whereas in the case of the lock-nut and the follower invented by me and above described an ordinary wrench will suffice for their operation; and none of the ratchet and base washers known or used preceding my invention have an elastic washer in combination with the corrugated or serrated follower and reciprocally corrugated or serrated nut of the angle above described.

Having thus fully described my invention, what I desire to claim and secure by Letters Patent is—

1. The combination of the cup, the spring, and the follower having one or more recesses on its under side.

2. The combination of the cup, the spring, and the follower having a ratchet on the upper side, the ratchet-teeth having an equal angle, or such angle as will permit the nut to be screwed closely and unscrewed by the use of an ordinary wrench.

3. The combination, with a bolt, of the cup, the spring, and the follower having on its upper side serrations or teeth of equal angle on each side, combined with a nut having on its under side serrations or teeth of equal angle on each side, or of such angle as to permit the nut to be screwed and unscrewed with the use of an ordinary wrench, the serrations or teeth of each follower or nut in use reciprocally closely fitting together.

4. The combination, with a bolt, of the cup, the spring, and the follower having corrugations on its upper side, with a nut having corrugations on its under side, or each such side having some reciprocal depression or elevation of such character as will permit the operation of the same by the use of an ordinary wrench.

N. EMORY SHAILER.

Witnesses:
J. C. COOK,
H. FRIEDMAN,
W. W. STEWART.